Figure 1:
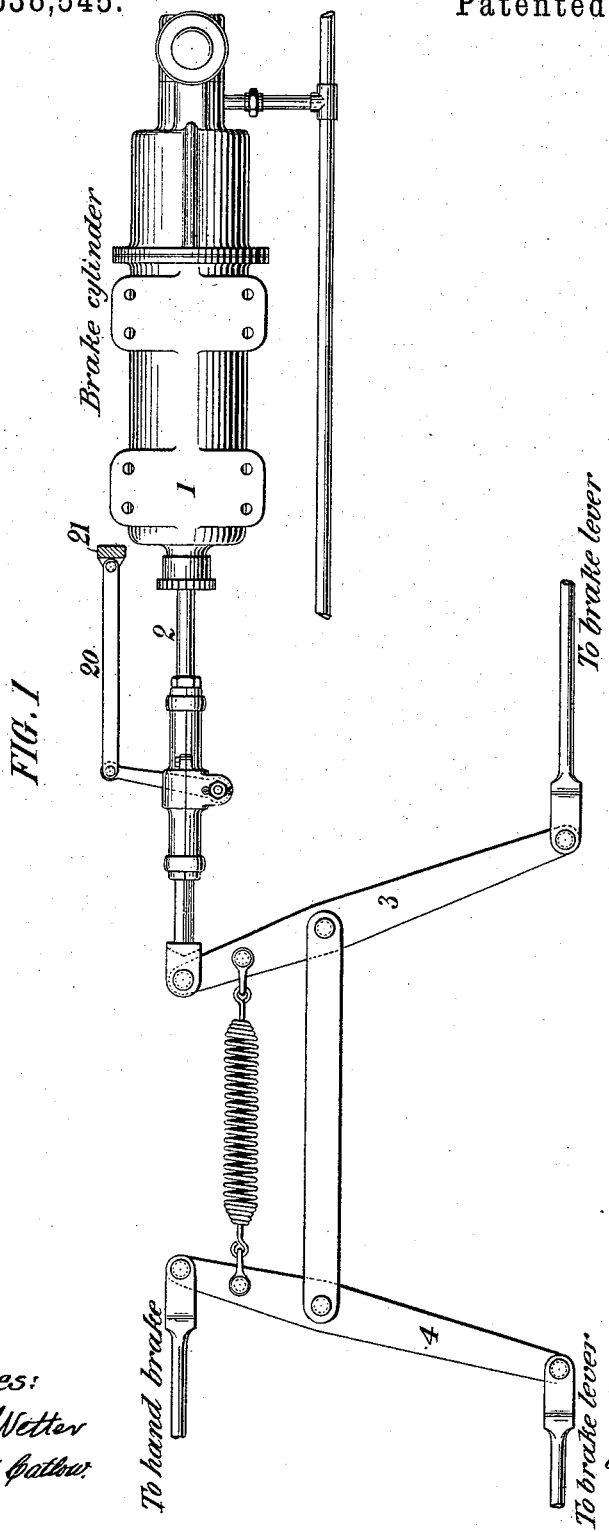

(No Model.) 2 Sheets—Sheet 1.

E. G. SHORTT & J. E. NORMAND.
SLACK ADJUSTER.

No. 538,545. Patented Apr. 30, 1895.

Witnesses:
Raphaël Netter
James N. Barlow

Inventors:
Edward G. Shortt
Joseph E. Normand
by Duncan & Page
Att'ys.

(No Model.) 2 Sheets—Sheet 2.
E. G. SHORTT & J. E. NORMAND.
SLACK ADJUSTER.
No. 538,545. Patented Apr. 30, 1895.
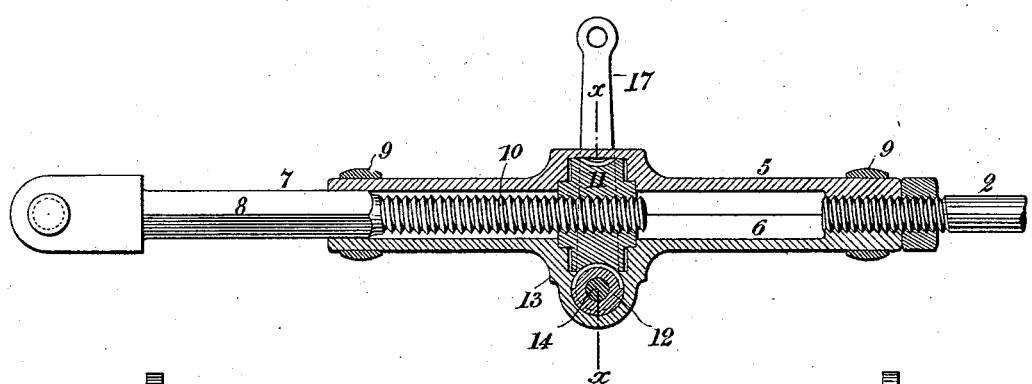
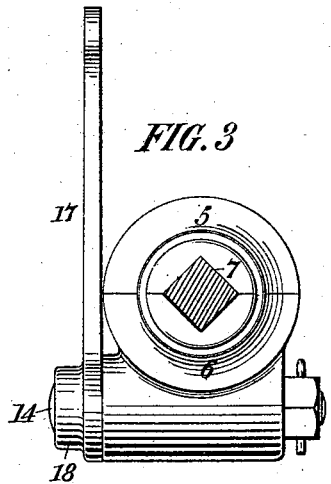
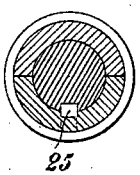
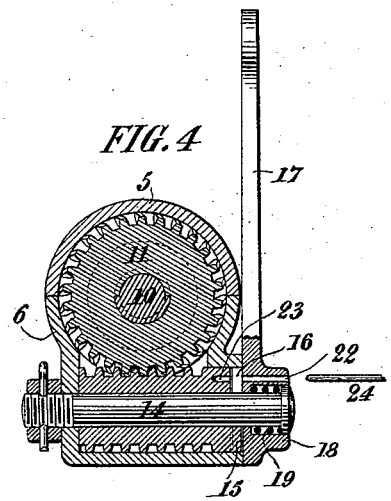
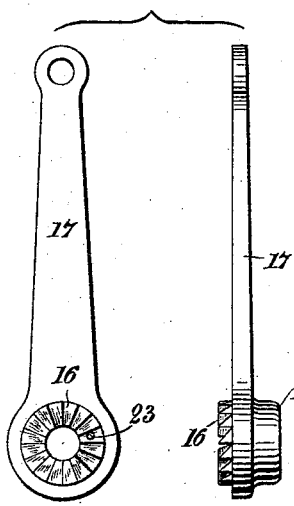
Witnesses:
Raphaël Netter
James N. Callow
Inventors
Edward G. Shortt,
Joseph E. Normand,
by Duncan & Page
Att'ys.

UNITED STATES PATENT OFFICE.

EDWARD G. SHORTT, OF CARTHAGE, AND JOSEPH ELIE NORMAND, OF WATERTOWN, ASSIGNORS TO CHARLES GOODWIN EMERY, OF NEW YORK, N. Y.

SLACK-ADJUSTER.

SPECIFICATION forming part of Letters Patent No. 538,545, dated April 30, 1895.

Application filed September 15, 1894. Serial No. 523,081. (No model.)

*To all whom it may concern:*

Be it known that we, EDWARD G. SHORTT, residing at Carthage, and JOSEPH ELIE NORMAND, residing at Watertown, in the county of Jefferson and State of New York, citizens of the United States, have invented certain new and useful Improvements in Automatic Adjusters, of which the following is a specification, reference being had to the accompanying drawings.

The invention relates to adjusting mechanism for automatically taking up the slack or wear of or effecting adjustment in various forms of power transmitting mechanism.

One object of the invention is to provide an adjuster capable of compensating for minute, as well as variations of considerable extent, and which is also capable of taking up or compensating for variation practically with the extent of such variation.

A further object of the invention is to so construct and arrange the parts of the adjusting device that they are both compact and simple in operation, but more particularly are so incased and protected as to prevent any false or undesired manipulation of the same.

The invention consists of an adjusting mechanism composed of two relative movable connection parts, which connections are adapted to be properly attached to power transmitting mechanism where it is desired to effect an adjustment of the same, and the connection parts of the adjuster are joined by means of a worm and gear, such worm having operating devices arranged between it and a relatively fixed point in such manner that as the connected parts of the machine are moved, the said worm will be rotated to effect an adjustment of the movable part of the adjuster in proportion as wear or slack or lack of adjustment occurs between the connected parts of the machine during their operation.

The invention also consists of a casing inclosing the movable parts of the adjuster so as to cover and contain the same, and to prevent exterior manipulation or adjustment thereof.

The drawings accompanying the specification illustrate our invention as contained in an adjuster adapted for use in a railroad car brake system. The office of the adjuster is to compensate for the wear on the brake shoes, the connections between the shoes and the operating air piston being regulated by such adjusting mechanism so that the faces of the brake shoes will be maintained in proper relative positions to the treads of the wheels. This adjustment is desirable for the reason that, in case of no adjuster being present, the wearing away of the brake shoes is likely to let the air cylinder piston have an excessive stroke and so be arrested by the head of its cylinder and prevented from applying its power to the brake shoes. We do not, however, confine ourselves to this use of an adjusting mechanism, for the same is applicable in various forms of machinery and power transmitting devices for the purpose of adjusting the same, taking up or compensating for wear of the parts, slack motion, &c.

Referring to the drawings, Figure 1 is a plan view of a portion of a car-braking mechanism operated by an air-cylinder piston, the same being provided with one form of our adjusting mechanism arranged and adapted to compensate for the wear of the brake-shoes. Fig. 2 is an enlarged detailed view, in central longitudinal section, of our adjusting mechanism. Fig. 3 is an enlarged end view of the same from the left hand of Fig. 2. Fig. 4 is a cross-section of the same on plane $x\ x$ of Fig. 2, looking from the right hand of such figure. Fig. 5 represents front and side elevation views, in enlarged detail, of the worm gear-arm which operates the mechanism. Fig. 6 is a cross-section of the casing, illustrating a modification to be hereinafter fully described.

Referring to these views in detail, 1 represents the power cylinder of an air brake system, which cylinder is to be considered as fixedly attached to the car body.

2 is the piston rod thereof which is connected by our adjusting mechanism to the levers 3 and 4 of the brake system that extends to and operates the brake shoes mounted on the car, this lever system being of any suitable or well known construction. For the purposes of this invention, this lever system may be considered as a type of other forms of power transmitting devices arranged between a source of power and the place of work to be done and containing or adjustably controlled by the adjuster mechanism.

The piston rod 2 enters and is fixedly secured to the two halves 5 and 6 of the casing of the adjuster. At the other end of this casing, a slide rod 7 is adjustably arranged in the same as shown, this rod being provided with square bearings 8 fitting in correspondingly shaped bearings in the casing whereby said rod is prevented from rotating but is permitted to have longitudinal motion in the casing. This rod 7 is directly attached to the brake lever system. The two halves 5 and 6 of the casing are half tubular and are held securely fastened together by collars or ring straps 9 driven over the ends of the same, the casing as a whole, being in general of a cylindrical form. The inner end 10 of the rod 7 is screw threaded and in normal position is separated from the piston rod 2 by a distance somewhat greater than the range of variation or slack to be taken up.

11 is a worm gear centrally threaded and mounted upon the inner end of the rod 7 and having its hub journaled in the casing in any suitable manner.

12 is a worm contained in a box 13 forming a part of the casing and axially mounted on the bolt 14, which worm is arranged to mesh with the worm gear 11. This worm is provided at one end with radial gear teeth 15 which engage correspondingly shaped teeth 16 on the gear arm 17, which arm is pivotally mounted on the bolt 14. This arm has a recessed hub 18 which contains the head of the bolt 14 as also a spring 19 arranged between such head and the inner face of the hub socket. Normally, the arm is held to mesh or engage with the radial gear on the end of the worm, but is permitted to rotate backwardly against such gear by the yielding of the spring 19. The arm 17 is to be attached to any proper fixed support as, through link 20, to the support 21, which is stationary as concerns the movable adjuster. Ordinarily, in a brake mechanism as shown, the link 20 would be attached to the brake cylinder or its supporting parts.

The operation of the mechanism will now be plain. When the brake piston is moved to apply the brakes the adjuster is also moved relatively to the link attachment of the arm 17. This will cause the arm 17 to be turned on its pivot, and if the motion be sufficient the gear 16 will slip by the worm gear to the amount of one or more teeth. When the brake piston returns to its first position, the worm and arm gears will engage and the partial rotation of the worm will be effected, thus turning the gear 11 and correspondingly moving connecting rod 7, which will lengthen or shorten, as the case may be, the connections between the lever system and the piston rod. It is to be understood that when the shoes are new, the parts will be arranged so that full working power may be affected without the brake piston coming in contact with its cylinder. If now, we assume the surface of the shoes to have been by one application for example, worn off, then it is obvious, upon another application the brake system and operating piston will have a slightly increased motion, and this increase of motion will cause the adjuster to operate to correspondingly lengthen or shorten the connections between the lever system and the brake piston.

When it is desired to readjust the mechanism, as in case of applying new and thicker shoes in lieu of worn and thin shoes, then it will be apparent that the movable rod in the adjuster should be repositioned in its gear, and to this end it is required that such gear be revolved backwardly. For this purpose we provide the rocking arm 17 with a perforation 22, and a like perforation 23 in the same cylindrical plane is made in the end of the worm. When, then it is desired to readjust the movable rod 7, the arm 17 will be disconnected from the support 21 and turned until the holes 22 and 23 coincide. Thereupon, a pin or key 24 may be inserted in said holes and the arm 17 thereby locked to the worm. The worm can now be rotated backwardly and the rod 7 projected from the casing of the adjuster to the required amount.

The pitch of the worm thread may vary as to the pitch of the thread on the rod 9 whereby the speed of movement between the geared parts may be relatively increased or decreased. It will be seen that the motion of the rod 7 in adjusting will be extremely small compared with the space of a single tooth on the gear arm, and accordingly practically a very slight variation as to the thickness of the shoes is immediately compensated for by the operation of the adjuster. It is also to be noted that the moving parts are entirely confined and protected against dust and moisture, as well as against malicious or unintentional operation.

In lieu of the square form of the rod 7 and its correspondingly shaped bearings in the casing 5 and 6, a cylindrical rod may be used as is shown in Fig. 6, and a feather 25 fixed to the rod or to the casing and entering a groove in the other part may be employed to insure the longitudinal movement of the rod and at the same time to prevent its rotation; also, the means of operating the worm may be of different kind, the essential feature being that the outer end of the gear-arm be held as against the movement of the parts that it operates. Other modifications of this device are possible, and we no not, therefore, confine ourselves to the exact forms shown.

What is claimed as new is—

1. In an adjuster for compensating for wear, slack or similar variation in power transmitting machinery, the combination of a movable and a fixed connection part, and a worm and gear arranged between such parts and adapted upon operation of the worm to adjust such parts relatively.

2. The combination in an adjusting mechanism, of a fixed and a movable connection, a gear engaging the movable piece, a worm wheel meshing with said gear and devices for turning said worm by the movement of the mechanism carrying the adjuster.

3. The combination in an adjusting mechanism of a movable and a fixed connection, a gear, and worm for connecting said connections and operating to adjust the same relatively, mechanism for turning said worm to effect said adjustment, and a casing—as the casing 5 and 6—for containing and protecting the movable parts of the adjuster.

4. In combination in an automatic adjuster, a casing or similar supporting device, a connection part fixed to said casing and a connection part adjustable in and carried by the casing, a worm and gear mounted in the casing and adjustably uniting the fixed and movable connection parts.

5. In combination with power transmitting mechanism, an adjusting mechanism therefor consisting of a relatively fixed connection and a movable connection joining parts of said power mechanism, and of a worm and gear arranged between said connections and capable of operation to adjust them relatively.

EDWARD G. SHORTT.
JOSEPH ELIE NORMAND.

Witnesses:
H. B. EDMONDS,
ROBT. F. GAYLORD.